(12) United States Patent
Hurley, IV et al.

(10) Patent No.: US 11,003,882 B2
(45) Date of Patent: May 11, 2021

(54) APPARATUS AND METHOD FOR REDUCING THE EFFECT OF AIM LIGHT ABERRATIONS IN A BARCODE READER

(71) Applicant: ZEBRA TECHNOLOGIES CORPORATION, Lincolnshire, IL (US)

(72) Inventors: William P. Hurley, IV, New York, NY (US); Igor Vinogradov, Oakdale, NY (US); Darran Michael Handshaw, Sound Beach, NY (US); Chinh Tan, East Setauket, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/600,304

(22) Filed: Oct. 11, 2019

(65) Prior Publication Data
US 2021/0110125 A1   Apr. 15, 2021

(51) Int. Cl.
*G06K 7/14* (2006.01)
*G06K 7/10* (2006.01)

(52) U.S. Cl.
CPC .......... *G06K 7/146* (2013.01); *G06K 7/1413* (2013.01); *G06K 2007/10524* (2013.01)

(58) Field of Classification Search
CPC ....... G06K 2007/10524; G06K 7/1413; G06K 7/146
USPC .............................. 235/462.06, 462.14, 375
See application file for complete search history.

(56) References Cited

U.S. PATENT DOCUMENTS

| | | | |
|---|---|---|---|
| 10,007,824 B1 * | 6/2018 | McQueen | G06K 7/10831 |
| 2010/0258632 A1 * | 10/2010 | Good | G06K 7/10831 235/472.01 |
| 2012/0160919 A1 * | 6/2012 | Chen | G06K 7/10722 235/462.06 |

* cited by examiner

*Primary Examiner* — Allyson N Trail
(74) *Attorney, Agent, or Firm* — Yuri Astvatsaturov (57) ABSTRACT

A method and apparatus for directing an aim light through a window of an image reader. The window has a cylindrically curved section. The aim light impinges on a portion of the cylindrically curved section of the window prior to partially passing through the window. A first amount of the aim light is passed through the window, and a second amount of the aim light is reflected into the cavity resulting in reflected aim light. The reflected aim light is directed away from the imaging assembly such that no or substantially no reflected aim light impinges on the imager of the imaging assembly.

26 Claims, 9 Drawing Sheets

APPARATUS AND METHOD FOR REDUCING THE EFFECT OF AIM LIGHT ABERRATIONS IN A BARCODE READER

BACKGROUND OF THE INVENTION

Figure 1:
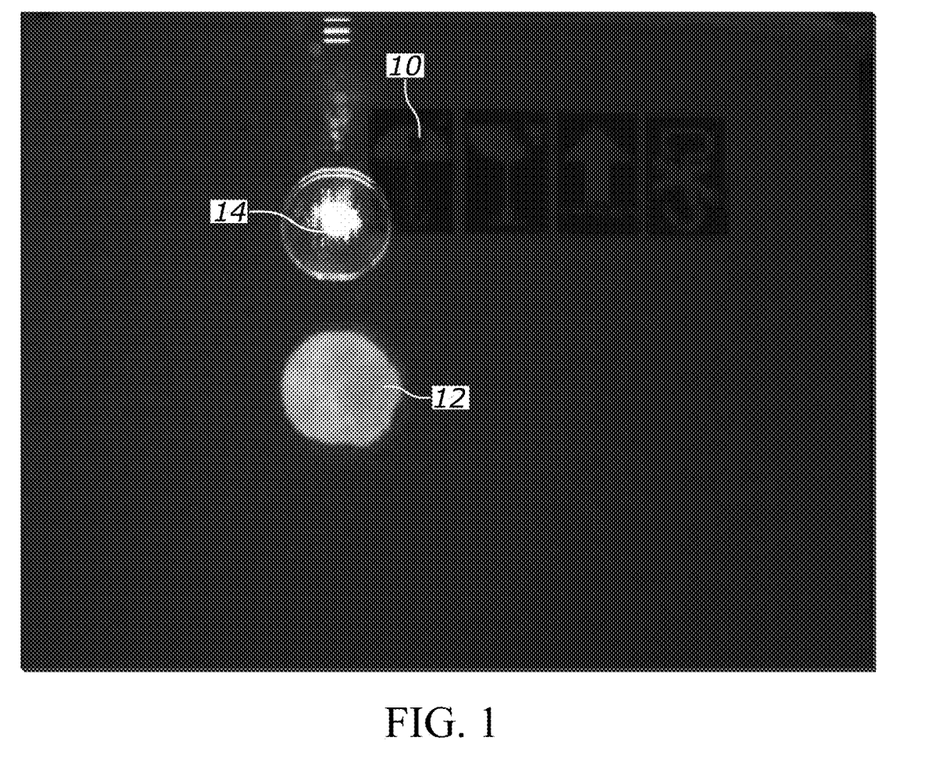
FIG. 1 is an image of an aiming light on a target with a stray light artifact as captured by a barcode imager.

Presentation imaging barcode readers typically have a window to protect the internal opto-mechanics, an imager, an illumination source, and an aiming light which visually indicates the imaging axis of the imager. Typically, the aiming light is concentric or near concentric with the central axis of the field-of-view of the imager though the usable range of the imager, so as to have minimal parallax between the aim light and the central axis. However, the window can internally reflect some of the aiming light back to the imager, thereby impairing the function of the imager when capturing and reading an image of the intended target. This is often referred to as "stray light". In particular, the stray light appears on the captured image as a light artifact 14 separate from the image of the aim light 12 on the target 10, as shown in FIG. 1. This light artifact can appear bright enough that the barcode reader algorithm reads the light artifact as the aim light on the target, in which case the barcode may not read the correct or intended target. This problem is particularly acute with barcode pick lists. Additionally, in barcode readers utilizing off-axis illumination, illumination sources are separated from the imaging axis in location and angle. This off-axis illumination benefits the decode of specularly reflective barcodes but creates specific mechanical constraints on the window shape and size.

Accordingly, there is a need for an improved technique for minimizing these light artifacts due to stray light artifacts caused by the window of a barcode reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an imaging assembly, and an aiming assembly. The housing has a cavity and a window. The window has a cylindrically curved section that forms at least part of a wall of the cavity. The imaging assembly is disposed within the cavity, and has an imager. The imager has a field-of-view (FOV) extending through at least a first portion of the cylindrically curved section of the window. The FOV has a central FOV axis. The imager is configured to capture either: i) light reflected from a target, and/or ii) light emitted from the target. The aiming assembly is disposed within the cavity and configured to emit an aim light. Prior to partially passing through the window, the aim light impinges on a second portion of the cylindrically curved section of the window. A curvature of the second portion of the cylindrically curved section of the window is configured to: i) pass a first amount of the aim light through the window, and ii) reflect a second amount of the aim light into the cavity resulting in reflected aim light. The reflected aim light is directed away from the imaging assembly such that no or substantially no reflected aim light impinges on the imager of the imaging assembly. The second amount of the aim light makes up all or substantially all of the reflected aim light.

Another aspect of the present disclosure provides a method of directing an aim light, an illumination light and a field-of-view (FOV) of an imager through a window of an image reader. The illumination light has a central illumination axis, the FOV has a central FOV axis, and the aim light has a central aiming axis. The imager and an aiming assembly are disposed within a cavity. The method includes: i) emitting an illumination light from an illumination assembly through a flat section of the window, ii) extending a FOV of an imager through a cylindrically curved section of the window, iii) emitting an aim light from an aiming assembly through the cylindrically curved section of the window, and iv) impinging the aim light on a second portion of the cylindrically curved section of the window prior to partially passing through the window. Impinging the aim light includes: i) passing a first amount of the aim light through the window, and ii) reflecting a second amount of the aim light into the cavity resulting in reflected aim light, the reflected aim light being directed away from the imaging assembly such that no or substantially no reflected aim light impinges on the imager of the imaging assembly. The second amount of the aim light makes up all or substantially all of the reflected aim light.

A further aspect of the disclosure provides an apparatus that includes a housing, an imaging assembly, an aiming assembly, and an illumination assembly. The housing has a first cavity, a second cavity and a window. The first and second cavity are optically isolated from one another. The window has a flat section forming at least part of a wall of the first cavity and a curvature forming at least part of a wall of the second cavity. The imaging assembly is disposed within the second cavity. The imaging assembly has an imager with a field-of-view (FOV) extending through at least a first portion of the curvature of the window. The FOV has a central FOV axis. The imager is configured to capture at least one of: i) light reflected from a target and ii) light emitted from the target. The aiming assembly is disposed within the second cavity, and configured to emit an aim light. The aim light has a central aiming axis. The illumination assembly is disposed within the first cavity, and configured to emit an illumination light through the flat section of the window. The illumination light has a central illumination axis. Prior to partially passing through the window, the aim light impinges on a second portion of the cylindrically curved section of the window. A curvature of the second portion of the cylindrically curved section of the window is configured to: i) pass a first amount of the aim light through the window, and ii) reflect a second amount of the aim light into the cavity resulting in reflected aim light, the reflected aim light being directed away from the imaging assembly such that no or substantially no reflected aim light impinges on the imager of the imaging assembly. The second amount of the aim light making up all or substantially all of the reflected aim light.

Figure 2A:
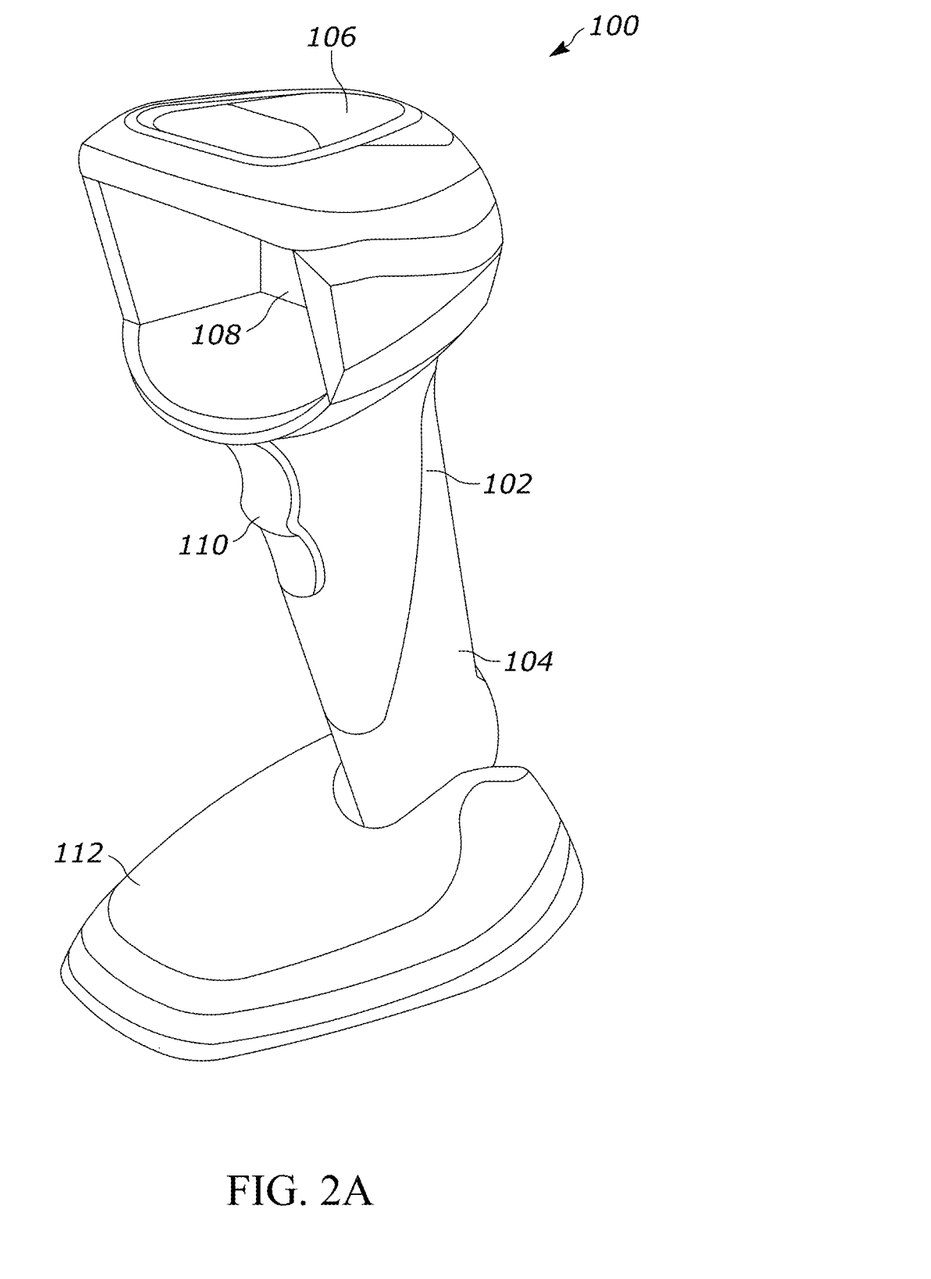
FIG. 2A is a perspective front and side view of an optical imaging reader in accordance with an embodiment.
Figure 2B:
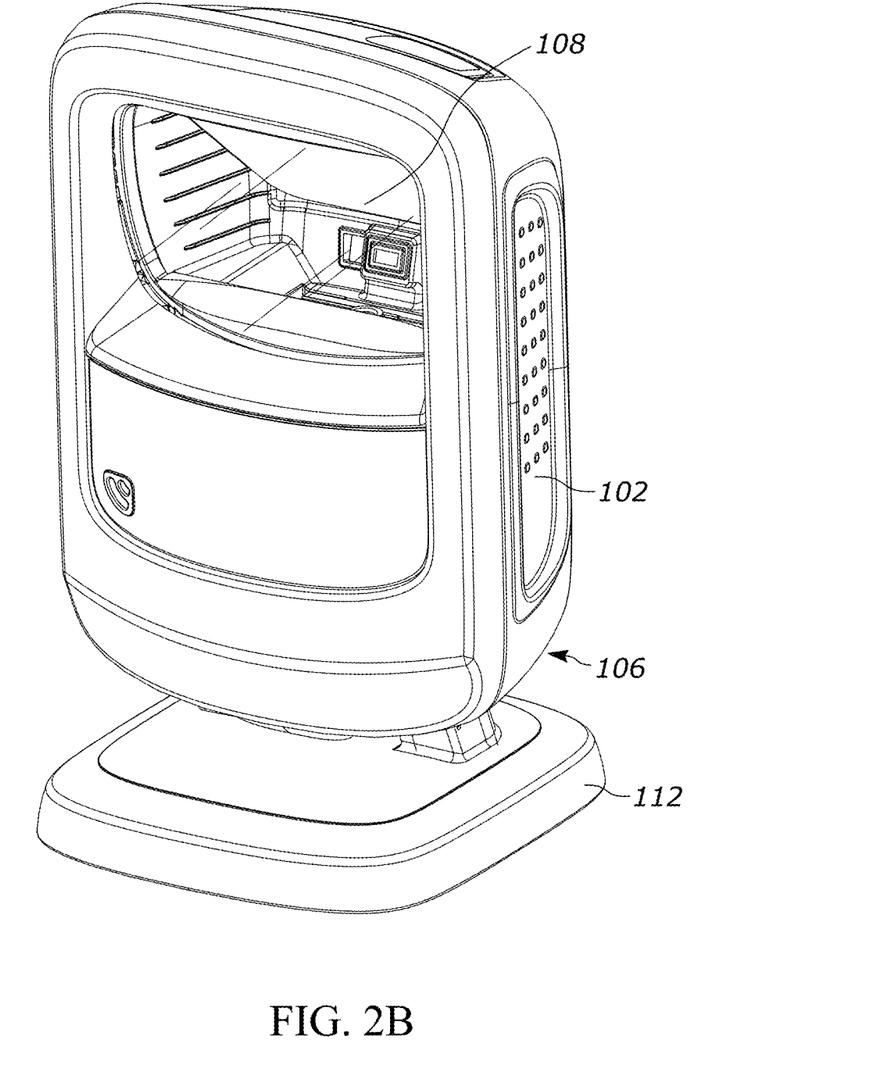
FIG. 2B is a perspective front and side view of an optical imaging reader in accordance with another embodiment.
Figure 3:
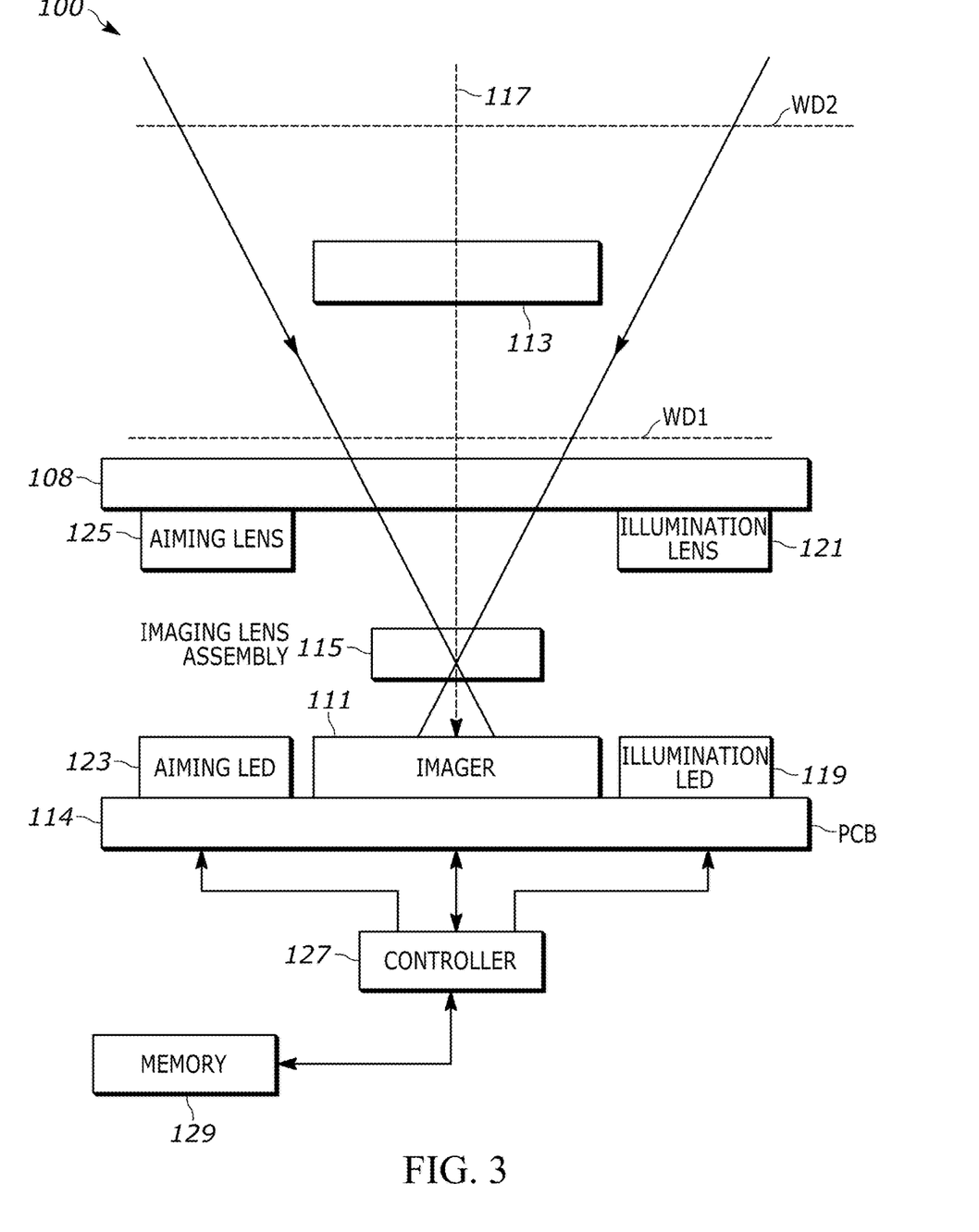
FIG. 3 is a schematic of various components of the readers of FIGS. 2A and 2B in accordance with some embodiments.

FIGS. 2A, 2B and 3 are exemplary embodiments of an optical imaging reader 100 and the components thereof. Referring now to the drawings, FIG. 2A illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112, also referred to as a base portion, attached to the handle portion 104 opposite the head portion 106. The base portion 112 is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station, and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIG. 2A, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis 107 obliquely angled relative to a central field of view axis 109 of a field of view of an imaging assembly within the scanning head 102. In the embodiment of FIG. 2B, the lower handle 104 is omitted, and the body 102 has front and back sides, and lateral sides, with the window 108 in the front side, such that a user is able to grip the reader 100 with one hand via the lateral sides.

For any of the reader embodiments, an imaging assembly includes a light-detecting sensor or imager 111 operatively coupled to, or mounted on, a printed circuit board (PCB) 114 in the reader 100 as shown in FIG. 3. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 108 in either mode of operation. The return light is scattered and/or reflected from a target 113 over the field of view. The imaging lens assembly 115 is operative for focusing the return light onto the array of image sensors to enable the target 113 to be read. The target 113 may be located anywhere in a working range of distances between a close-in working distance (WD1) and a far-out working distance (WD2). In a preferred embodiment, WD1 is about one-half inch from the window 106, and WD2 is about thirty inches from the window 106.

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113.

An aiming light assembly is also mounted in the imaging reader 100 and preferably includes an aiming light source 123, e.g., one or more aiming LEDs, and an aiming lens 125 for generating and directing a visible aiming light beam away from the reader 100 onto the target 113 in the handheld mode. The aiming light beam has a cross-section with a pattern, for example, a generally circular spot or cross-hairs for placement at the center of the target 113 as shown in FIG. 2, or a line for placement across the target 113, or a set of framing lines to bound the field of view, to assist a reader use in visually locating the target 113 within the field of view prior to image capture.

As also shown in FIG. 3, the imager 111, the illumination LED 119, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113 to obtain data related to the target 113. Although FIG. 3 shows the imager 111, the illumination LED 119, and the aiming LED 123 as being mounted on the same PCB 114, it should be understood that different embodiments of the reader 100 may have these components each on a separate PCB, or in different combinations on separate PCBs. For example, in an embodiment of a reader, the illumination LED 119 is provided as an off-axis illumination (i.e., has a central illumination axis that is not parallel to the central FOV axis of the imager 111) in a compartment within the housing 102 that is optically isolated from a compartment housing the imager 111 and aiming LED 123.

Figure 4:
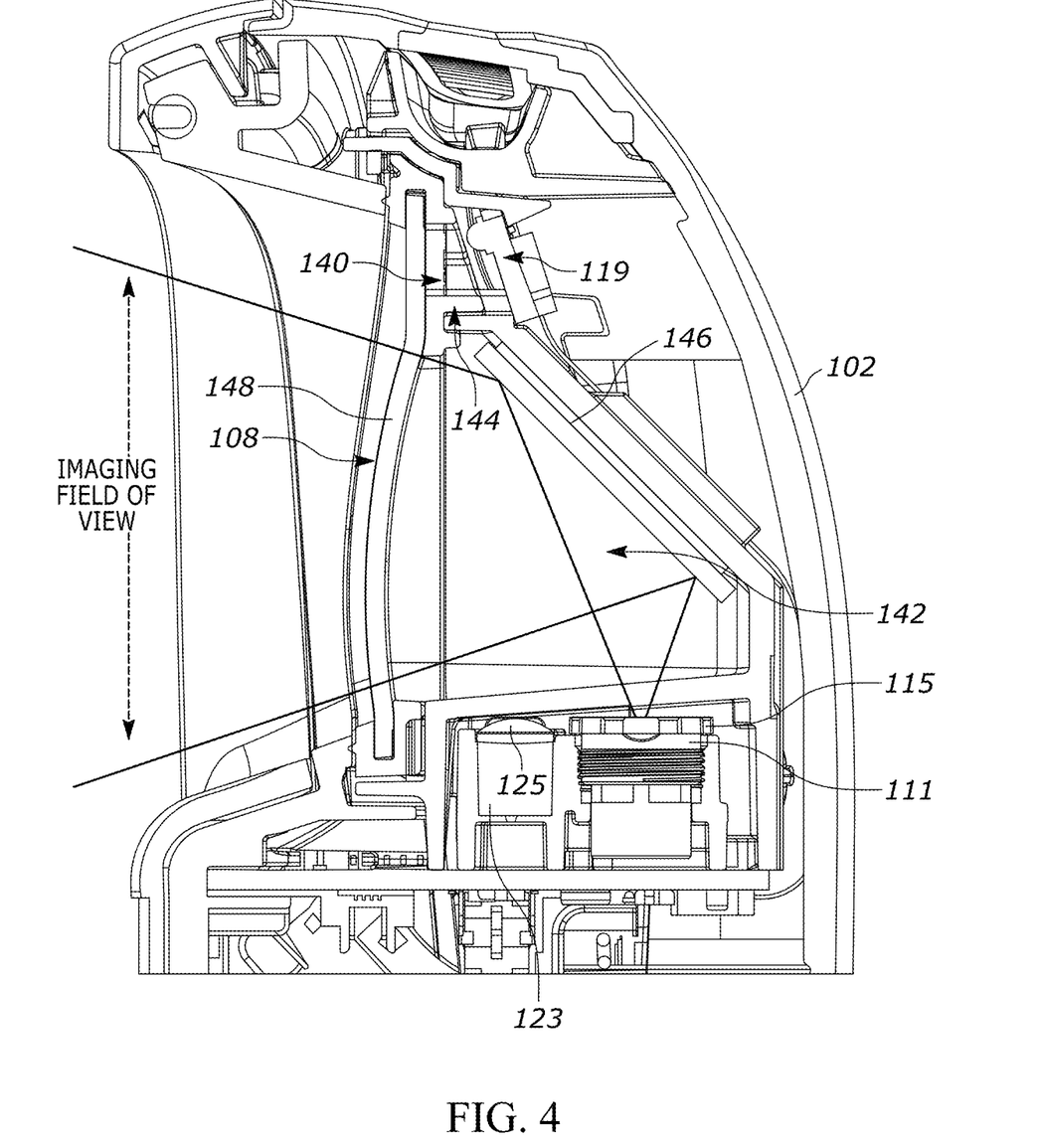
FIG. 4 is cross-sectional side view of an optical imaging reader head portion in accordance with an embodiment.

Referring to the cross-sectional diagram of FIG. 4, which is exemplary for any of the optical imaging reader 100 embodiments, the illumination LED 119 is provided in an illumination cavity 140 within the housing 102 that is optically isolated from an imaging cavity 142, such as by a floor 144 of the illumination cavity 140, as shown in FIG. 4, in order to minimize or eliminate stray light artifacts from the illumination LED 119. The floor 144 extends to the window 108 such that the window 108 forms a wall of both the illumination cavity 140 and the imaging cavity 142. The imager 111, imaging lens assembly 115, aiming LED 123 and aiming lens 125 are provided in the imaging cavity 142. In an embodiment, a fold mirror 146 is provided to redirect the image within the FOV of the reader 100 to the imaging lens assembly 115. The fold mirror 146 also redirects the aiming light from the aiming lens 125 such that the central axis of the aiming lens 125 is parallel to, or coaxial with, the central FOV axis of the imager 111 upon exiting the window 108. In the embodiment of FIG. 4, the central illumination axis of the illumination light is non-parallel to the central axis of the FOV (and non-parallel to the central axis of the aiming light), such that the central illumination axis intersects the central FOV axis at some distance external to the window 108.

As shown in FIG. 4, the window 108 includes a cylindrically curved section 148 through which the FOV of the imager 111 extends and through which at least a portion of the aiming light passes. In the shown embodiment, the window 108 also includes a flat section 149 through which at least a portion of the light from the illumination LED 119 passes. Preferably, the curved section 148 of the window is the same size or larger than the FOV and continuous in shape so as to allow the full image within the FOV to reach the imager 111 without introducing aberrations to the image.

The cylindrically curved section 148 helps correct for stray light artifacts from reflections of the aiming light off the interior of the window 108. In particular, the curvature of the curved section 148 is cylindrical in the vertical direction (i.e., the central axis of the cylindrical curve is horizontal), as opposed to flat or spherical. A flat window, for example, reflects the aiming light back to the imager 111, and the reflected aiming light may be mistaken by the reader 100 for the aiming light on the target as shown in FIG. 1, though a flat window 149 is preferred for the illumination LED 119 so as to not require the illumination LED 119 to be pushed back further into the housing 102. A tilted flat window directs the reflected aiming light further from the aiming light in the image, but does not fully redirect and collect stray light artifacts away from the imager 111. In order for a tilted window to completely direct the stray light artifacts away from the imager 111, the angle of the tilt must be significant in order to accommodate the size of the FOV of the imager 111. This tends to increase the overall footprint of the reader 100. Although a spherical window may be effective in directing the reflected aiming light away from the imager 111, a spherical window introduces mechanical fit issues when incorporating off-axis illumination.

Figure 5:
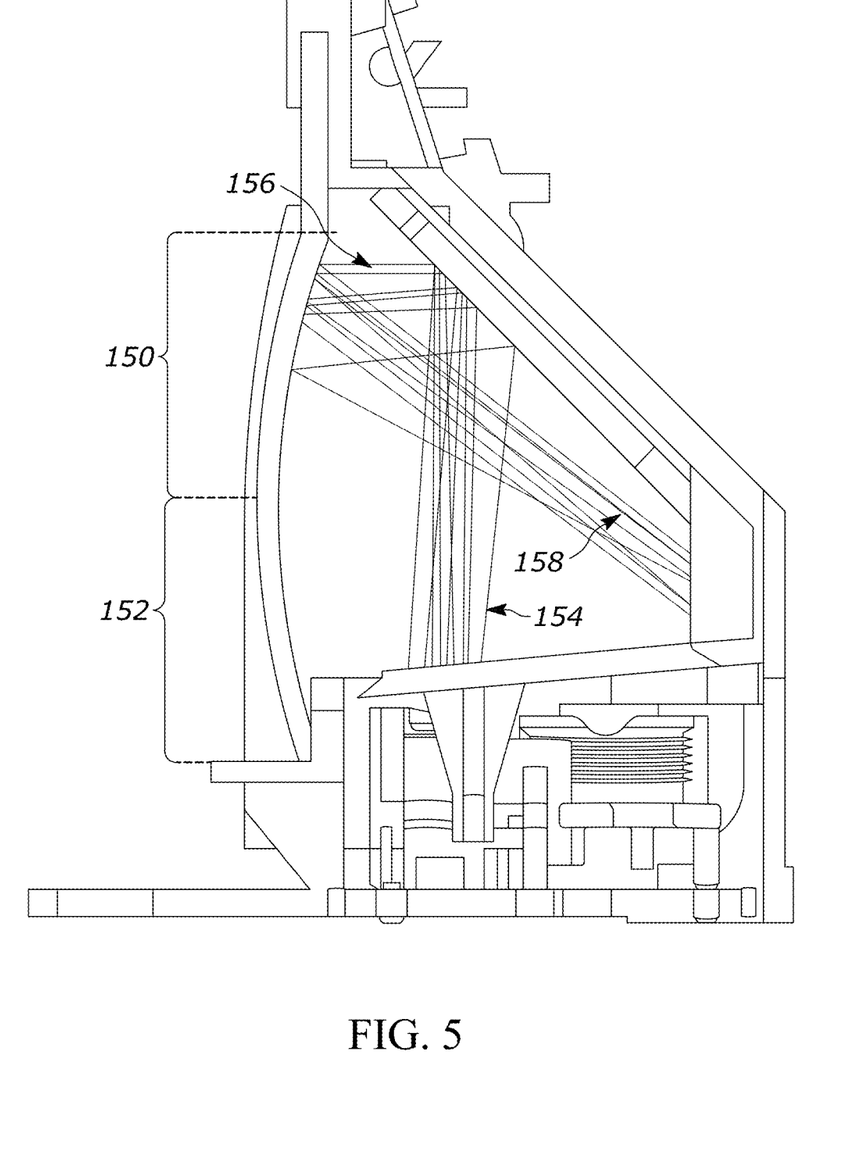
FIG. 5 is a cross-sectional side view of an optical imaging reader showing reflected aiming light rays within the housing in accordance with an embodiment.

A cylindrically curved window, on the other hand, redirects internally reflected aiming light off the interior of the window 108 away from the imaging lens 115, as shown in FIG. 5. In particular, the emitted aiming light 154 through the aiming lens 125 is directed towards the fold mirror 146. The emitted aiming light 154 is then redirected by the fold mirror 146 towards the curved section 148 of the window 108. Most of the aiming light 156 passes through the window 108 and is projected on a target as an indication of where to aim the imager 111.

Preferably, the radius of curvature of the window is near the distance between the exit window and the aiming aperture, though this may be limited by overall mechanical constraints of the imaging cavity 142. The radius is continuous throughout the curved portion 148 of the window, or at least within the imaging field of view, to avoid local distortions in the image. Further, the radius of the curved portion 148 effectively collects and redirects internally reflected aiming light off the window 108 towards a confined area away from the imager 111. A preferred internal radius of the curved portion 148 of the window 108 is within the range of 35 millimeters and 200 millimeters, and, more specifically, 63.5 millimeters. The preferred thickness of the window 108 through at least the curved portion 148 is within the range of 1 millimeter to 2 millimeters, and, more specifically 1.5 millimeters.

Although both half portions 150, 152 of the curved portion 148 direct the reflected aiming light away from the imager 111, the folding mirror 146 directs internally reflected aiming light coming off a forward tilting portion 152 towards the base of the window 108. As such, the floor 144 of the illumination cavity 140 would have to be elongated to meet the window 108, thereby causing the floor 144 to intersect the imaging FOV and reduce the effective FOV of the reader 100. Even if the floor is not elongated to avoid intersecting the FOV, there remains a gap between the window 108 and the floor 144, which allows stray light from the illumination LED 119 to reach the imager 111. The window 108 would also interfere with the lower section of the imaging cavity, unless the radius of the cylindrically curved portion was increased to create a shallower curve. However, this would reduce the effectiveness of the cylindrically curved window.

Accordingly, it is preferred that the aiming light 156 impinges the interior surface of the cylindrically curved section 148 of the window 108 on the half portion 150 where the window 108 curves/tilts back, as shown in FIG. 5. In turn, internally reflected aiming light 158 off the backwards tilting portion 150 is directed by the curvature towards the back of the imaging cavity 142, away from the imager 111. Generally speaking, the internally reflected aiming light 158 represents all or substantially all of the light impinging the back of the imaging cavity, with it being understood that additional light may be reflected within the imaging cavity 146 that is not reflected off the window 108. In an embodiment, the internally reflected aiming light 158 comprises at least 90% of the light reflected within the imaging cavity 146.

In order to maintain optimal imaging performance, the curved portion 148 of the window 108 is centered about the central imaging axis of the FOV of the imager 111 as seen through the window 108. However, this may cause mechanical fit issues with the remainder of the housing 102 and internal components. Accordingly, the angle of the curved portion 148 may be provided at a slight tilt, thereby changing where the aim light is incident on the inner radius of the curved portion 148. In an embodiment, the curved portion 148 of the window 108 is tilted about a point on the circumference of the curvature within the range of 0 and 15 degrees, and, more specifically, 5 degrees. As such, the aim light is incident on an inner radius of the cylindrically curved portion of the window where the tangent angle of the cylindrically curved section of the window is within the range of 5 degrees and 15 degrees relative to a vertical line through the center of the cylinder when the apparatus is rested upright on a flat horizontal surface, and, more specifically, where the tangent angle of the curved window is 12.7 degrees from such a vertical. Although such a tilt to the curved portion 148 of the window 108 may cause some slight astigmatism, results from a modular transfer function show that the astigmatism does not significantly degrade performance.

A light absorbing portion 159 comprising a light absorbing material provided at the back of the imaging cavity 146 to absorb the internally reflected aiming light 158. Preferably, the light absorbing portion 159 is black or dark-colored plastic with some texture to scatter any light that is not absorbed. Alternatively, the light absorbing portion 159 may be tape, a die cast (or sheetmetal) part with light absorptive coating, or a black or dark-colored rubber part. Practically speaking, substantially all (e.g., slightly less than all) of the internally reflected aiming light 158 is directed away from the imager 111. In an embodiment, at least 90%, and, more specifically, between 90% and 95%, of the internally reflected aiming light 158 is directed away from the imager 111 using the curved section 148 of the window and absorbed by the light absorbing portion 160.

Figure 6A:
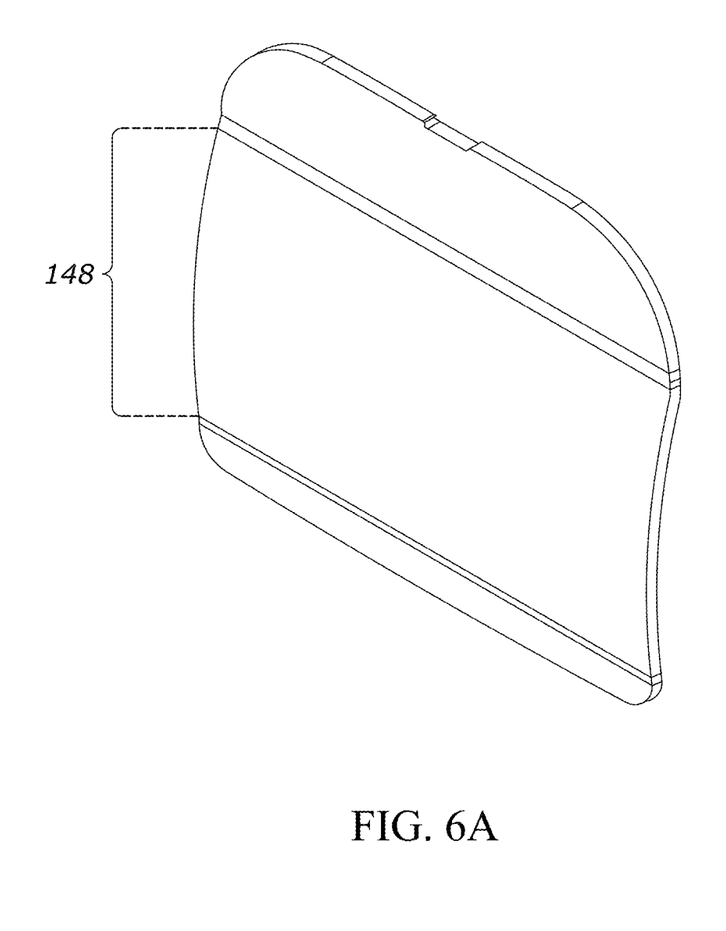
FIG. 6A is a perspective front and side view of a window of an optical imaging reader in accordance with an embodiment.
Figure 6B:
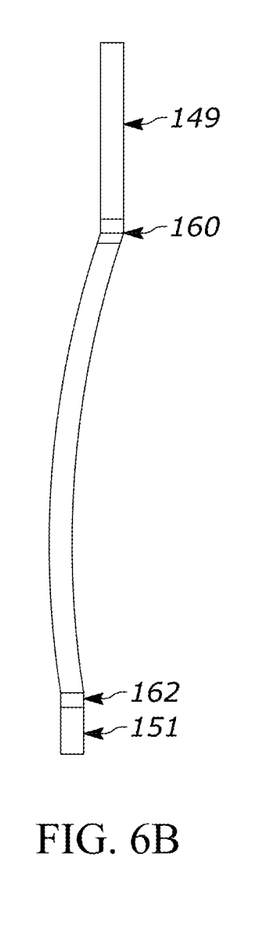
FIG. 6B is a side view of the window of FIG. 6A in accordance with an embodiment.

FIGS. 6A and 6B provide further views of the embodiment of the window 108 from FIGS. 4 and 5. For example, in the shown embodiment, the window 108 includes the curved portion 148 to correct for artifacts in the image introduced from stray internally reflected aiming light. As mentioned above, the curved portion 148 is large enough such that the shape is continuous within the imaging FOV so as to not introduce aberrations to the image. The window 108 further includes the flat portion 149 which passes the illumination light, and a second flat portion 151 to mount the window 108 to the housing 102. With respect to the latter, the second flat portion 151 may be manufactured from the same material as the curved portion 148 and flat portion 149, or from a different material. The second flat portion 151 may be fit into a groove of the housing 102, adhered to the housing 102 and/or otherwise affixed to the housing 102. In order to avoid a harsh segmented appearance between the curved portion 148 and the flat portions 149, 151 of the window 108, gradual transitions in the curvature away from the nominal shape, referred to as fillets 160, 162, can be added near the vertical ends of the window 108. These transitions away from the continuous cylindrically curved portion 148 may degrade the imaging performance, so it is preferred that the fillets 160, 162 are outside the imaging field of view.

Figure 7A:
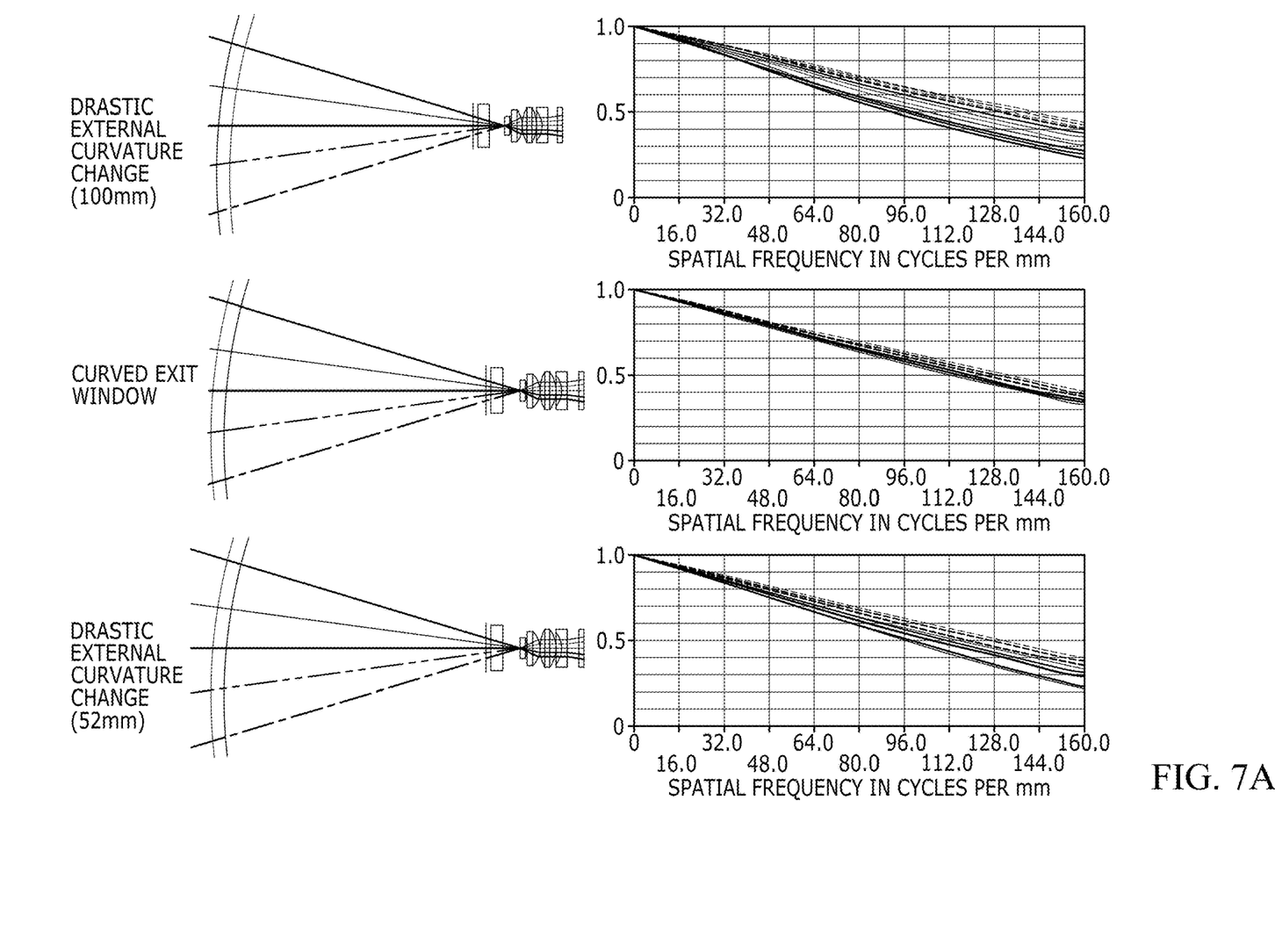
FIG. 7A is a modulation transfer function comparison of the effect of astigmatism on the imaging system of an optical imaging reader using windows of different external radii including a window in accordance with an embodiment.
Figure 7B:
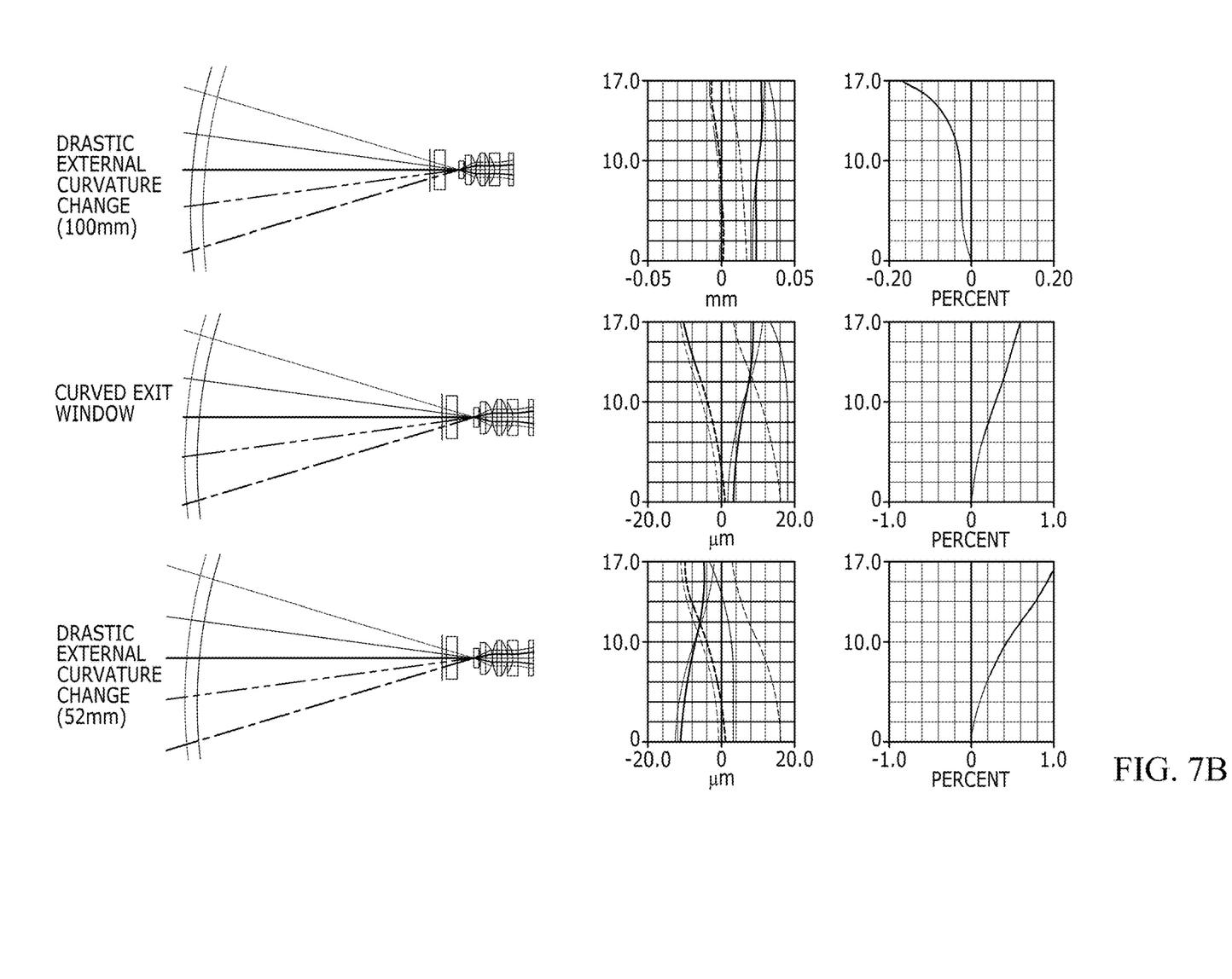
FIG. 7B is a +Y field curvature and distortion comparison using windows of different external radii including a window in accordance with an embodiment.

FIGS. 7A and 7B depict results from a modular transfer function (MTF), and a +Y field curvature and distortion comparison as performed demonstrating the effects of a curved window having different external radii of curvature. In particular, FIG. 7A shows an MTF comparison for a first window 160 having an external radius that varies by as much as 100 millimeters, a second window 162 having an external radius a consistent distance from the internal radius, and a third window 170 having an internal radius that varies by as much as 52 millimeters. As seen from the graphs to the right in FIG. 7A, the first window 160 and third window 164 each introduce significant astigmatism to the imager 111. On the other hand, the second window 162 introduces only a very slight astigmatism that is virtually indistinguishable to the imager 111, while also redirecting internally reflected aim light away from the imager 111. FIG. 7B shows a +Y field curvature and distortion comparison between the three types of windows 160, 162, 164. In particular, the graphs to the right of FIG. 7B show that there is significant change to the field curvature or distortion induced by the first and third windows 160, 164, but very little with the second window 162.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a housing having a cavity and a window, the window having a cylindrically curved section forming at least part of a wall of the cavity;
an imaging assembly disposed within the cavity, the imaging assembly having an imager with a field-of-view (FOV) extending through at least a first portion of the cylindrically curved section of the window, the FOV having a central FOV axis, the imager configured to capture at least one of: light reflected from a target and light emitted from the target; and
an aiming assembly disposed within the cavity, the aiming assembly configured to emit an aim light,
wherein prior to partially passing through the window, the aim light impinges on a second portion of the cylindrically curved section of the window, and
wherein a curvature of the second portion of the cylindrically curved section of the window is configured to:
pass a first amount of the aim light through the window; and
reflect a second amount of the aim light into the cavity resulting in reflected aim light, the reflected aim light being directed away from the imaging assembly such that no or substantially no reflected aim light impinges on the imager of the imaging assembly,
the second amount of the aim light making up all or substantially all of the reflected aim light.

2. The apparatus of claim 1, wherein the window further comprises a flat section configured to mount the window to the housing.

3. The apparatus of claim 2, wherein the window further comprises one or more fillets between the flat section and the cylindrically curved section of the window, wherein the one or more fillets are configured to collectively transition the cylindrically curved section of the window into the flat section of the window.

4. The apparatus of claim 1, wherein the cylindrically curved section of the window comprises a constant radius.

5. The apparatus of claim 1, wherein the cylindrically curved section of the window is the same size or larger than the FOV of the imager.

6. The apparatus of claim 1, wherein the curvature of the second portion of the cylindrically curved section of the window is configured to reflect the second amount of the aim light to a light absorbing portion of a wall of the cavity opposite the cylindrically curved section of the window, the light absorbing portion configured to absorb all or substantially all of the reflected aim light.

7. The apparatus of claim 6, wherein the light absorbing portion is configured to absorb at least 90 percent of the reflected aim light.

8. The apparatus of claim 1, wherein the aim light is incident on an inner radius of the cylindrically curved section of the window where a tangent angle of the cylindrically curved section of the window is within the range of 5 degrees and 15 degrees relative to a vertical line through a center of the cylinder when the apparatus is rested upright on a flat horizontal surface.

9. The apparatus of claim 1, wherein the cylindrically curved section of the window is tilted about a point on a circumference of the cylindrically curved section of the window within the range of 0 degrees and 15 degrees.

10. The apparatus of claim 1, wherein an internal radius of the cylindrically curved section of the window is within the range of 35 millimeters and 200 millimeters.

11. The apparatus of claim 1, wherein the cylindrically curved section of the window has a constant thickness throughout the curvature of the cylindrically curved section of the window.

12. The apparatus of claim 11, wherein the cylindrically curved section of the window has a constant thickness within the range of 1 millimeter and 2 millimeters.

13. The apparatus of claim 1, wherein the second amount of the aim light makes up at least 90 percent of the reflected aim light.

14. A method of directing an aim light, an illumination light and a field-of-view (FOV) of an imager through a window of an image reader, the method comprising:
emitting an illumination light from an illumination assembly through a flat section of the window, the illumination light having a central illumination axis;
extending a FOV of an imager through a cylindrically curved section of the window, the imager disposed within a cavity, the FOV having a central FOV axis; and
emitting an aim light from an aiming assembly through the cylindrically curved section of the window, the aiming assembly disposed within the cavity, the aim light having a central aiming axis, and
impinging the aim light on a second portion of the cylindrically curved section of the window prior to partially passing through the window, wherein impinging the aim light comprises:
passing a first amount of the aim light through the window; and
reflecting a second amount of the aim light into the cavity resulting in reflected aim light, the reflected aim light being directed away from the imaging assembly such that no or substantially no reflected aim light impinges on the imager of the imaging assembly,
the second amount of the aim light making up all or substantially all of the reflected aim light.

15. The method of claim 14, wherein:
the central FOV axis is non-parallel relative to the central illumination axis, and
the central aiming axis is non-parallel relative to the central illumination axis.

16. The method of claim 14, further comprising optically isolating the illumination light from the aim light and the FOV of the imager.

17. The method of claim 14, further comprising intersecting the illumination light and the FOV of the imager a distance from an exterior surface of the cylindrically curved section of the window.

18. The method of claim 14, further comprising directing the reflected aim light to a wall opposite the cylindrically curved section of the window.

19. The method of claim 14, wherein emitting the aim light comprises emitting the aim light such that the aim light is incident on an inner radius of the cylindrically curved section of the window where a tangent angle of the cylindrically curved section of the window is within the range of 75 degrees and 80 degrees relative to a central aiming axis.

20. The method of claim 14, wherein the FOV is the same size or smaller than the surface of the cylindrically curved section.

21. The method of claim 14, wherein the flat section of the window comprises an optical element configured to redirect the central illumination axis towards the central FOV axis.

22. An apparatus comprising:
a housing having a first cavity, a second cavity and a window, the window having a flat section forming at least part of a wall of the first cavity and a curvature forming at least part of a wall of the second cavity, the first cavity and the second cavity being optically isolated from one another;
an imaging assembly disposed within the second cavity, the imaging assembly having an imager with a field-of-view (FOV) extending through at least a first portion of the curvature of the window, the FOV having a central FOV axis, the imager configured to capture at least one of: light reflected from a target and light emitted from the target;
an aiming assembly disposed within the second cavity, the aiming assembly configured to emit an aim light, the aim light having a central aiming axis; and
an illumination assembly disposed within the first cavity, the illumination assembly configured to emit an illumination light through the flat section of the window, the illumination light having a central illumination axis,
wherein prior to partially passing through the window, the aim light impinges on a second portion of the cylindrically curved section of the window, and
wherein a curvature of the second portion of the cylindrically curved section of the window is configured to:
pass a first amount of the aim light through the window; and
reflect a second amount of the aim light into the cavity resulting in reflected aim light, the reflected aim light being directed away from the imaging assembly such that no or substantially no reflected aim light impinges on the imager of the imaging assembly,
the second amount of the aim light making up all or substantially all of the reflected aim light.

23. The apparatus of claim 22, wherein the central illumination axis is non-parallel relative to the central FOV axis and the central aiming axis.

24. The apparatus of claim 22, further comprising: one or more fillets between the flat section and the curvature of the window, wherein the one or more fillets are configured to collectively transition the curvature of the window into the flat section of the window.

25. The apparatus of claim 24, wherein the one or more fillets are outside the FOV of the imager.

26. The apparatus of claim 22, wherein the flat section of the window comprises an optical element configured to redirect the central illumination axis towards the central FOV axis.

* * * * *